United States Patent
Adachi

(10) Patent No.: US 9,639,759 B2
(45) Date of Patent: May 2, 2017

(54) VIDEO PROCESSING APPARATUS AND VIDEO PROCESSING METHOD

(71) Applicant: CANON KABUSHIKI KAISHA, Tokyo (JP)

(72) Inventor: Keiji Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 13/896,875

(22) Filed: May 17, 2013

(65) Prior Publication Data

US 2013/0343604 A1    Dec. 26, 2013

(30) Foreign Application Priority Data

Jun. 22, 2012 (JP) ................. 2012-141467

(51) Int. Cl.
  *G06K 9/00* (2006.01)
(52) U.S. Cl.
  CPC ...... *G06K 9/00711* (2013.01); *G06K 9/00342* (2013.01); *G06K 9/00771* (2013.01); *G06T 2207/30201* (2013.01)
(58) Field of Classification Search
  None
  See application file for complete search history.

(56) References Cited

U.S. PATENT DOCUMENTS

| | | | |
|---|---|---|---|
| 7,873,221 B2 | 1/2011 | Okada et al. | |
| 2008/0231709 A1* | 9/2008 | Brown | G06K 9/00771 348/169 |
| 2009/0059007 A1* | 3/2009 | Wagg | G06K 9/00369 348/157 |
| 2009/0169067 A1* | 7/2009 | Chang et al. | 382/118 |
| 2009/0220123 A1* | 9/2009 | Tojo | G06K 9/00771 382/103 |
| 2011/0074970 A1* | 3/2011 | Sukegawa | G06K 9/00261 348/222.1 |
| 2013/0064424 A1 | 3/2013 | Adachi et al. | |
| 2013/0083010 A1* | 4/2013 | Kuwahara | G06K 9/00228 345/419 |

FOREIGN PATENT DOCUMENTS

| | | |
|---|---|---|
| JP | 2002-373332 A | 12/2002 |
| JP | 2007-135115 A | 5/2007 |
| JP | 2009-211311 A | 9/2009 |
| JP | 2010-050934 A | 3/2010 |
| JP | 2010-088093 A | 4/2010 |
| JP | 4626493 B | 2/2011 |
| JP | 2012-103752 A | 5/2012 |
| WO | 2012/029518 A1 | 3/2012 |

OTHER PUBLICATIONS

Japanese Office Action in Japanese Patent Application No. 2012141467.

* cited by examiner

*Primary Examiner* — Manav Seth
*Assistant Examiner* — Ryan P Potts
(74) *Attorney, Agent, or Firm* — Fitzpatrick, Cella, Harper & Scinto

(57) ABSTRACT

A video processing apparatus tracks an object in a video and performs detection processing for detecting that an object in the video is a specific object such that a number of times the detection processing is performed within a predetermined period on a tracking object not detected to be the specific object is more than a number of times the detection processing is performed within the predetermined period on a tracking object detected to be the specific object.

6 Claims, 6 Drawing Sheets

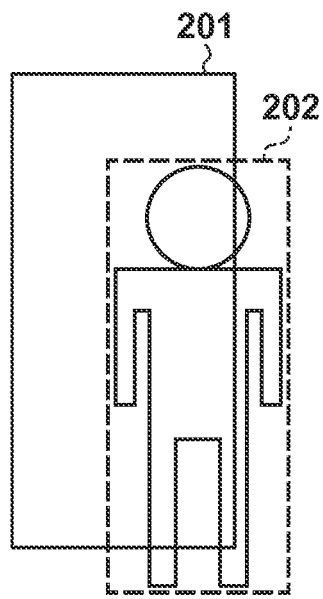
FIG. 2A
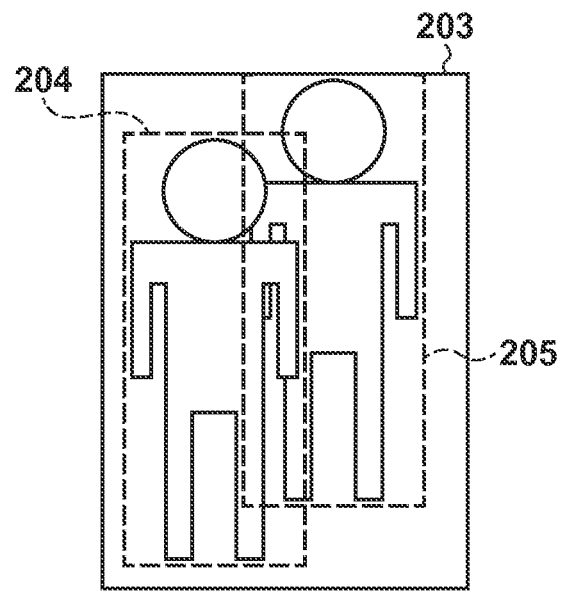
FIG. 2B
FIG. 3
| Object ID | 32 |
| --- | --- |
| Creation time | 2011/9/1/12:34:54 |
| Timestamp | 2011/9/1/12:34:58 |
| --- | --- |
| Position | (15,20) |
| Boundingbox | (10,10),(20,30) |
| Size | 200 |
| Attribute | Human |

| Parameter 1 | |
|---|---|
| Coordinates | (100,100),(100,300) |
| Region Type | Line |
| Size | 100-200 |
| Attribute | human |
| Event | cross_right_to_left |

VIDEO PROCESSING APPARATUS AND VIDEO PROCESSING METHOD

BACKGROUND OF THE INVENTION

Field of the Invention

The present invention relates to a video processing apparatus, a video processing method, and particularly to a technique for performing monitoring using video.

Description of the Related Art

Conventionally, in the case where a specific target such as a face or a human body is detected in video of a monitoring camera, generally detection in an image of an object that corresponds with a match pattern is performed using a single (or multiple in accordance with an angle) match pattern(s) (dictionary) in which are stored characteristics of a target object.

In Japanese Patent Laid-Open No. 2009-211311, a technique is disclosed in which a plurality of local patterns are extracted using a match pattern for the entire area of an image while changing the size of the image, local characteristic amounts are calculated, and then, from the sum total of the results of performing weighting of the local characteristic amounts, it is determined whether or not there is a human body. Furthermore, in Japanese Patent Laid-Open No. 2010-088093, a technique is disclosed in which a processing method of face detection processing is changed in accordance with an orientation of a camera body. Also, in Japanese Patent Laid-Open No. 2002-373332, a tracking technique that uses pattern matching is described. For this kind of processing of specific object detection, the background of increasing resolutions of network camera devices, and the ability to execute at high speed in order to perform real time processing for monitoring and the like have been necessary. Japanese Patent Laid-Open No. 2007-135115 describes, as a method of realizing an increase in processing speed, a technique for switching, based on a past image capture result, a priority of a reduced image (layer) that uses pattern matching.

Meanwhile, in the case where crossing detection and intruder detection are performed with video analysis processing, generally a tracking line, which is a moving object tracking trajectory, is used. Determination of object crossing or determination of an intrusion is performed by detecting intersection or inclusion of a determination region frame or determination line segment set in an image and a tracking line.

By combining the crossing detection/intrusion detection and the specific object detection processing described above, specific object crossing detection/intrusion detection is possible.

In Japanese Patent Laid-Open No. 2010-50934, detection of a face is performed and face tracking based on motion information detected from a correlation between a current frame and a past frame is performed. Based on this tracking result, determination of a object crossing of a specific area is made possible.

However, there is a problem of processing load being heavy in the specific object detection processing with template matching, etc., as described above. For this reason, such methods as lowering the detection processing frequency to a level at which processing is possible by applying processing for thinning out processing image frames in time-series, etc., and performing batch processing of recorded video rather than real time processing have been adopted.

So, currently there is a problem in that there is a tradeoff relationship in which performing detection processing at high precision makes for high load and low speed and to perform processing at high speed requires adopting a low load detection method.

SUMMARY OF THE INVENTION

In view of the above described problem, the present invention provides a technique for detecting at high speed and high precision a specific object in video acquired from a monitoring camera, etcetera.

According to one aspect of the present invention, there is provided a video processing apparatus comprising a tracking unit configured to track an object in a video and a first detection unit configured to perform detection processing for detecting that an object in the video is a specific object such that a number of times the first detection unit performs the detection processing within a predetermined period on a tracking object that the first detection unit did not detect to be the specific object is more than a number of times the first detection unit performs the detection processing within the predetermined period on a tracking object that the first detection unit detected to be the specific object.

Further features of the present invention will become apparent from the following description of exemplary embodiments (with reference to the attached drawings).

BRIEF DESCRIPTION OF THE DRAWINGS

FIGS. 2A and 2B are views for showing examples of association of an object and a human body.

FIG. 3 is a view for showing an example configuration of information managed by a trajectory management unit 106.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In the first embodiment, explanation is given for a configuration in which when specific object detection processing is performed using object information, a frequency of specific object detection processing is adjusted in accordance with object attribute information.

Figure 1:
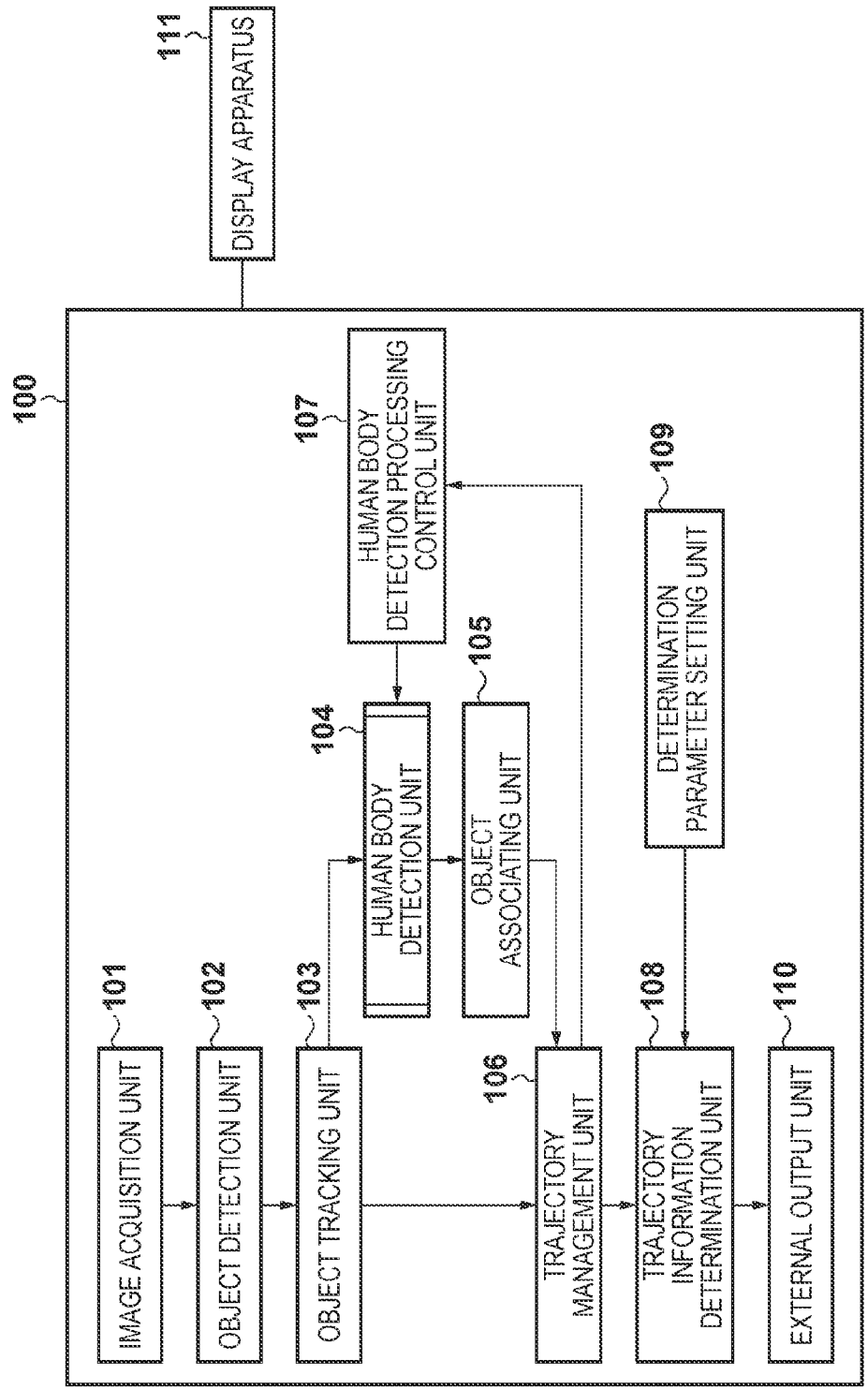
FIG. 1 is a block diagram for showing an example functional configuration of a video processing apparatus 100.

Firstly, referring to FIG. 1, an example of a functional configuration of a video processing apparatus 100 will be explained. The video processing apparatus according to the present embodiment can be applied to a computer apparatus such as an image processing circuit embedded in a capturing apparatus such as a monitoring camera, or a personal computer.

The video processing apparatus 100 comprises an image acquisition unit 101, an object detection unit 102, an object tracking unit 103, a human body detection unit 104, an object associating unit 105, a trajectory management unit 106, a human body detection processing control unit 107, a trajectory information determination unit 108, a determination parameter setting unit 109, and an external output unit 110. The video processing apparatus 100 may be a general PC (personal computer) or an image processing circuit incorporated in a camera that can capture a moving image, or another device, so long as it can realize the function as a video processing apparatus. Note, the function of each processing unit is performed by a CPU (not shown) reading out a corresponding program from a memory, for example, built into the video processing apparatus 100 and executing it.

The video processing apparatus 100 is connected to a display apparatus 111 comprising a CRT or a liquid crystal display, etcetera. The display apparatus 111 acquires a processing result of the video processing apparatus 100 and displays the processing result with an image, text, sound, etcetera.

The image acquisition unit 101 acquires a frame image of a still image or a moving image provided externally and outputs the acquired still image or moving image to the subsequent object detection unit 102. The image acquisition unit 101, in a case where a moving image was acquired, outputs sequentially each frame image constituting the moving image to the object detection unit 102, and a case where a still image was acquired, outputs the still image to the object detection unit 102. Note, regarding the supply origin of the moving image or the still image, it is not specifically limited, and may be a capture apparatus or a server apparatus, etcetera, that supplies the moving image or the still image via a wire or wirelessly.

Also, it is not limited to being external, and the moving image or the still image may be acquired from a memory in the video processing apparatus 100. In the following description a case will be explained where a single image is input into the object detection unit 102 whether the image acquisition unit 101 acquires a moving image or a still image. In the former case, this single image corresponds to the frame images that constitute the moving image, and in the latter case this single image corresponds to the still image.

The object detection unit 102 detects an object in the frame image from the image acquisition unit 101 with a background subtraction method. Information of a detected object comprises position information on the image, circumscribed rectangle information, and object size information. The object detection unit 102, so long as it can execute processing for detecting an object in an image, is not limited to any particular method of doing so.

In a case where the object detection unit 102 detected the same object in the image of the frame of interest as the object detected in the image of the frame one frame previous to the frame of interest, the object tracking unit 103 associates the objects in the frames. In other words, an object is tracked over a plurality of frame images. For example, suppose that the object tracking unit 103 assigned an object ID=A to an object detected by the object detection unit 102 in the image of the frame one frame previous to the frame of interest. Then, in a case where the object detection unit 102 detected this object in the frame of interest, the object tracking unit 103 also assigns the object ID=A to the object. In this way, in a case where the same object is detected over a plurality of frames, the same object ID is assigned to the objects. Note, a new object ID is assigned to an object newly detected in a frame of interest.

As a method by which the object tracking unit 103 may determine that there is a similar object over a plurality of frames, there is a method in which, using motion vectors of a detection object, it is determined that it is the same object if a motion predicted position of an object is within a predetermined distance of a detected object position. Also, there is a method of associating objects for which there is a high correlation between frames using such things as size (area), shape and color of the object. It is enough that the object tracking unit 103 be able to execute processing for tracking by determining whether there is the same object over a plurality of frames. For this reason there is no limitation to a specific method, and it does not matter what the method is if similar processing is performed.

The human body detection unit 104 detects a human body by performing human body detection processing on a region that the object detection unit 102 detected using a match pattern (dictionary). Furthermore, regarding the region of a tracking object that has been determined to be a human body, the frequency at which human body detection processing is performed is reduced. In this way, by reducing the scope and the frequency of the performance of human body detection processing, it is possible to lower the load of the video processing apparatus 100 that performs the human body detection, and to perform the processing at high speed. Alternatively, by having a region in which the human body detection processing load is lowered, the human body detection processing may be carried out at high speed and high precision on other regions.

In general, in the case where a specific object is detected, the match pattern is changed in accordance with the detection target object. In the case where a human body is detected as well, by distinguishing usage of match patterns used for a front facing orientation and a side facing orientation, an increase in processing speed and an increase in detection precision can be expected.

Also, the match pattern is not limited to a front facing orientation and a side facing orientation, and may also include diagonal and overhead angles as well. Also, there is no limitation to a full body, and match patterns specific to an upper half of a body, a face or feet may also be used. Furthermore, the match pattern is not limited to a human body alone and may be created in order to detect a specific target such as a face and a car, a train or an airplane. Furthermore, for specific objects including objects other than human bodies that are asymmetrical left/right or asymmetrical front/back, a plurality of match patterns corresponding to angles at which a specific object is reflected such as in a vertical direction, in a horizontal direction, etcetera may be used.

Here, it is sufficient that the human body detection unit 104 has a function for detecting a human body in an image, and it is not limited to pattern processing. Also, in the present embodiment the detection target is a human body, but the invention is not limited to this. The detection target may be a face, an automobile or an animal. Regarding the detection method of these objects, as long as it can detect the specific target, anything is acceptable. Furthermore, multiple specific object detection processing procedures on an object may be performed if there is a specific object detection unit that detects a plurality of types of specific objects and simultaneous multiple detection is possible. Also, the object detection unit 102 does not necessarily need to perform human body detection in a detected region, and processing of human body detection may performed on the entire image.

The object associating unit 105 determines an association between an object that the object detection unit 102 detected and a human body detected by the human body detection unit 104. Referring to FIGS. 2A and 2B, explanation of an example of association of a detected object and a detected human body will be given. FIG. 2A shows a case in which a circumscribed rectangle 202 of a detected human body is not contained in a circumscribed rectangle 201 of a detected object. In this case, when an overlap ratio of the circumscribed rectangle 202 of a human body with respect to the circumscribed rectangle 201 of an object exceeds a preset threshold association is performed.

The overlap ratio is the ratio of the area where the circumscribed rectangle 201 of an object and the circumscribed rectangle 202 of the human body overlap and the area of the circumscribed rectangle 202 of the human body. FIG. 2B shows a case in which a plurality of human bodies were detected in a circumscribed rectangle 203 of a detected object. In this case, when the overlap ratio with the circumscribed rectangle 203 of a circumscribed rectangle 204 of a human body and with a circumscribed rectangle 205 of a human body exceeds a threshold, association is performed respectively.

The trajectory management unit 106 manages information for each object acquired by the object detection unit 102 and the object tracking unit 103. FIG. 3 shows an example configuration of information managed by the trajectory management unit 106. In management information 301 that the trajectory management unit 106 manages, information for each object (object information) 302 is managed. In other words, in the management information 301, object information 302 for each object ID is managed. Within object information 302 corresponding to a single object, information 303 for each frame (Timestamp) in which the object was detected is managed.

In this information 303 is included a coordinate position at which the object was detected (Position), information defining a circumscribed rectangle that contains a region in which the object was detected (Boundingbox), a size of the object (size) and an attribute (Attribute). Of course the information that can be included in the object information is not limited to this, and so long as the processing described below can be achieved, any kind of information can be included. The various information that the trajectory management unit 106 manages is used by the trajectory information determination unit 108.

The trajectory management unit 106 updates corresponding position information attributes when, for example, the human body detection unit 104 detects a human body and the object associating unit 105 performs association. Here, in addition, update of past position information attributes may also be performed according to a result of association. Also, the same association result may be set for subsequent position information attributes as well. By performing this kind of processing, regardless of the time of a tracking result of objects having the same ID, they will always have the same attribute value (human body, for example).

The human body detection processing control unit 107 performs setting to the human body detection unit 104 of a detection region and a detection frequency at which human body detection processing is performed in accordance with tracking object information managed by the trajectory management unit 106. The details of the setting method of the detection region and the detection frequency will be explained later.

The trajectory information determination unit 108 functions as a crossing object detection unit and performs crossing determination processing of an object corresponding with a detection line for object detection according to parameters set by the determination parameter setting unit 109 and information that the trajectory management unit 106 manages.

The determination parameter setting unit 109 performs setting of parameters for determining whether or not an object in a frame image crossed the detection line for object detection, and specifically parameters that define the detection line for object detection. Also, the parameters may be acquired externally.

Figures 4, 5:
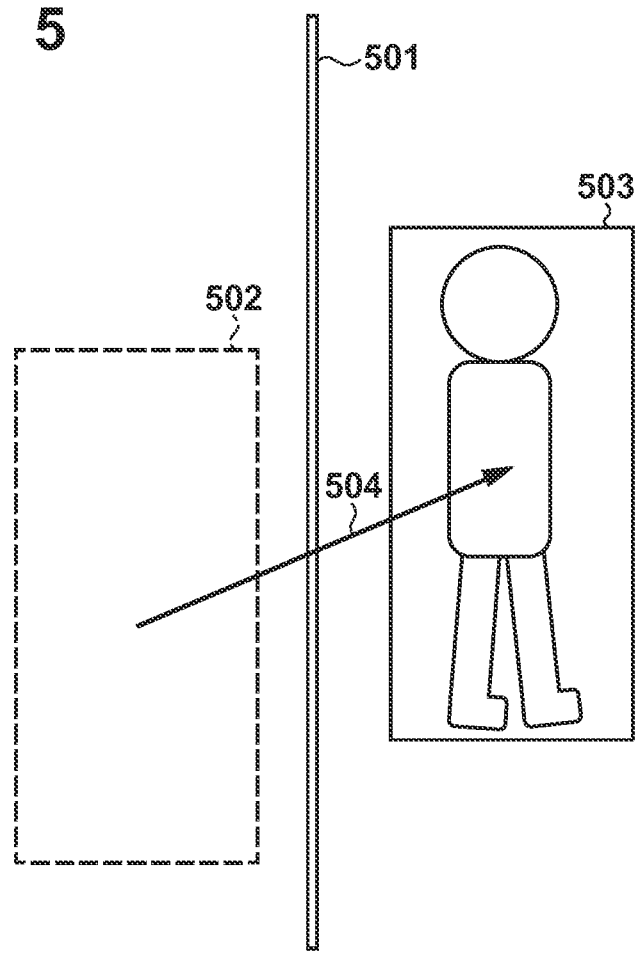
FIG. 4 is a view for showing an example configuration of a parameter.
FIG. 5 is a view for describing a human body attribute object crossing determination.

The determination parameter setting unit 109 sets the parameters that are acquired or set to the trajectory information determination unit 108. An example configuration of the parameter that the determination parameter setting unit 109 sets here is shown in FIG. 4. Regarding the parameter shown in FIG. 4, a line that connects the coordinate (100, 100) and the coordinate (100, 300) in the display screen of the display apparatus 111 (Line) is defined as a detection line for object detection. Also, with this parameter it is defined that in the case where an object having a human body attribute and a size (Size) from 100 to 200 crosses the detection line for detection from right to left (cross_right_to_left) this object is made to be the detection target. Further, regarding the crossing direction for crossing determination performance, it is possible to set that direction from the starting point to the end point is from left to right (cross_left_to_right), from right to left (cross_right_to_left) or in both directions (cross_both).

Referring to FIG. 5, explanation will be given of processing that the trajectory information determination unit 108 performs in the case where the determination parameter shown in FIG. 4 is set.

The trajectory information determination unit 108 determines whether a motion vector 504 going from a circumscribed rectangle 502 of a human body attribute object in a frame that is one frame previous to the frame of interest to a circumscribed rectangle 503 of a human body attribute object in a frame of interest intersects with a line segment 501 defined in the parameter. Determination of whether or not there is intersection is a determination of whether or not the human body attribute object crossed the line segment 501. The determination result of the trajectory information determination unit 108 may be output externally via the external output unit 110. Also, in the case where the external output unit 110 is a display apparatus comprising a CRT or a liquid crystal display, the external output unit 110 may be used instead of the display apparatus 111.

Figure 7A:
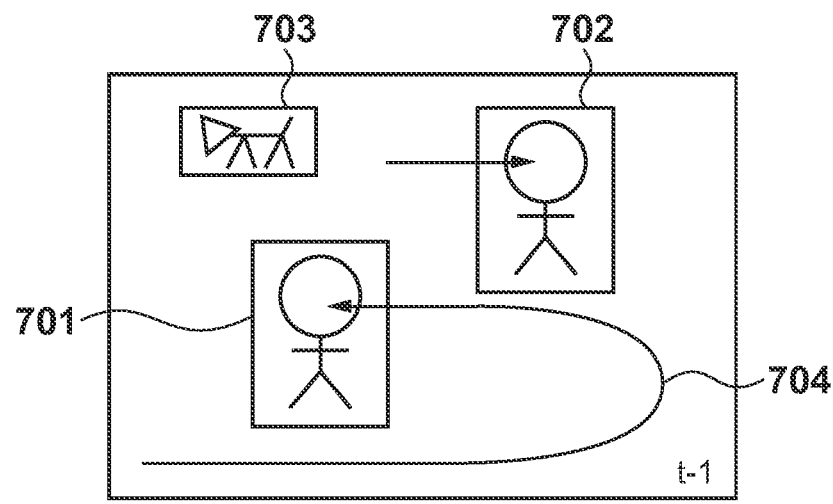
FIGS. 7A and 7B are views for describing processing by which a human body detection processing control unit 107 determines a detection region.
Figure 7B:
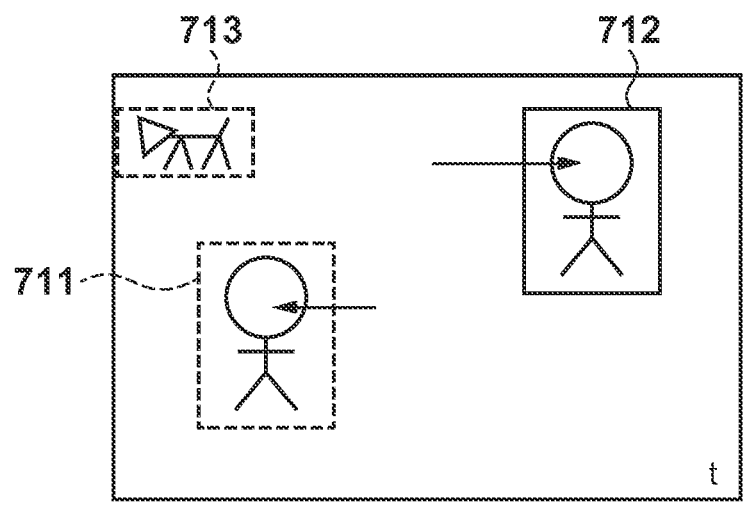

Here, referring to FIGS. 7A and 7B, details of processing in which the human body detection processing control unit 107 executes detection region and detection frequency settings by which the human body detection unit 104 performs human body detection processing in accordance with tracking object information that the trajectory management unit 106 manages. FIGS. 7A and 7B are examples of screens for explaining processing in which the human body detection processing control unit 107 determines the detection region.

As a rule, the human body detection unit 104 performs human body detection processing on a region that the object detection unit 102 detected. However the human body detection processing control unit 107 performs further detection region control on the human body detection unit 104 using management information that the trajectory management unit 106 manages.

FIG. 7B shows a frame of interest (the frame currently being processed (frame t)), and FIG. 7A shows a frame one frame previous to the frame of interest (frame t−1). In FIG. 7A, rectangles 701, 702 and 703 are frames that show that objects were detected at each of their positions, tracking processing is being performed by the object tracking unit 103, and they are circumscribed rectangles of tracking objects managed by the trajectory management unit 106. Assume that the result of human body detection processing in frame t−1 was that only for the tracking object circumscribed rectangle 701 was a human body detected and a human body attribute associated. Also, assume that detection processing other than human body detection processing, in this case, for example, dog detection processing, was similarly performed, and that for tracking object circumscribed rectangle 703 a dog was detected and a dog attribute was associated.

Next, it becomes frame t (FIG. 7B) and firstly the object detection unit 102 performs object detection processing. After that, the object tracking unit 103 performs object association between frame t−1 and frame t. For tracking objects that are associated as the same between the frames, tracking trajectory information in the trajectory management unit 106 so that the same object ID as in the previous frame be inherited as described previously. Also, attributes assigned to a tracking object are inherited without change. Assume that in frame t, tracking object 711, tracking object 712 and tracking object 713 are associated with tracking object circumscribed rectangle 701, tracking object circumscribed rectangle 702 and tracking object circumscribed rectangle 703 respectively, and the same object IDs are inherited.

Next, specific object detection processing control in frame t starts with human body detection processing. Firstly, the region (Boundingbox) for objects for which a human body attribute was previously assigned (Attribute=Human) in the trajectory management unit 106 is extracted. In frame t the numeral 711 denotes a tracking object for which a human body attribute is assigned.

Next human body detection processing is performed on moving object regions detected by the object detection unit 102, and human body detection processing on the tracking object circumscribed rectangle 711 to which a human body attribute is assigned is omitted or the detection frequency at which human body detection processing is executed is lowered. The human body detection processing on the tracking object circumscribed rectangles for which a human body attribute is assigned may be performed, for example, every second frame. Meanwhile, human body detection processing on a moving object region to which a human body attribute was not assigned may be performed for every frame. Here, the region for which omitting is done is a circumscribed rectangle region, but so long as the information is such that an object region can be known, any kind of information, such as silhouette information of an object may be used for object information managed by the trajectory management unit 106. Also, determination of whether or not to omit human body detection processing using a region in which a only a specific range was reduced or expanded from the circumscribed rectangle of the tracking object may be done. Regarding setting of this kind of processing target region, configuration may be taken so that moving object detection processing and precision and speed of human body detection processing be changeable depending on the setting state of the capture apparatus.

Usually, in human body detection processing in a frame image of nothing but objects to which attributes are not assigned, human body detection processing is performed on all detected moving object regions. However, as described above, by reducing the number of regions that are detection targets, the processing load can be reduced.

Also, even in the case where dog detection processing is similarly performed alongside human body detection, the same kind of effect can be achieved by only performing detection processing on object detection regions other than the tracking object circumscribed rectangle 713 to which a dog attribute is assigned. In this way, by repeating the aforementioned processing association can be performed even when a plurality of specific object detection targets were set. Also, alternatively, rather than repeating processing, regarding a tracking object to which a particular attribute is assigned, other specific object detection processing may be omitted. For example, human body detection processing on a tracking object circumscribed rectangle to which a dog attribute is assigned, may be performed, for example, every second frame. For tracking object regions to which an attribute is assigned, a priority of performing specific object detection processing is made lower than a moving object region to which an attribute is not assigned. This processing is particularly effective at improving speed in the case where the precision of specific object detection processing is high and there is no overlap amongst objects.

In the present embodiment, human body detection processing on object regions to which a human body attribute is assigned is omitted for the tracking object, but re-detection processing control may be changed to be in accordance with frequency of attribute assigning; specifically the number of times within a predetermined time period that the attribute is assigned.

For example, when the human body detection processing control unit 107 performs extraction of a tracking object to which a human body attribute is assigned, extraction is performed not just in the frame of interest but also in a specific number of frames from it. Only a tracking object for which the human body attribute is assigned at least a predetermined number of times in the specific number of frames is extracted, and human body detection processing is omitted for the circumscribed rectangle region of the object to which the human body attribute is assigned at least the predetermined number of times. Here, for example, a tracking object detected as a human body 5 times in the last second, is considered to have a high likelihood of being a human body, and so the frequency of again performing human body detection processing for that region is lowered. Also, by performing distinguishing using the number of times an attribute is assigned limiting to frames within a specific number of frames, it is possible to again perform human body detection processing periodically even on a tracking object to which a human body attribute is assigned for a few frames consecutively.

Alternatively, control may be performed to omit human body detection processing based on the number of times a human body was distinguished after a tracking target object first appears on the screen, setting not to perform limitation to a specific number of frames.

Also, alternatively, the object associating unit 105 lowered the frequency at which human body detection processing is performed in accordance with a frequency at which a human body attribute is assigned to a tracking object within a predetermined time period in the past, but this may be performed based on the frequency result of detection of a human body within a predetermined time period in the past. For example, this is a processing method in which human body detection is performed and an attribute is assigned only to an object for which detection as a human body happened at least a predetermined number of times within a predetermined period.

In this way, by determining the number of times an attribute is assigned in not only the frame of interest but also frames within a predetermined number, it is possible to avoid incorrectly omitting human body detection processing in a case where a human body was falsely detected in just one frame.

Also, a method of changing a frequency of again performing detection processing in accordance with the number of times an attribute is assigned within a predetermined time period in the past was described above, but the processing order may be controlled rather than the detection frequency. An example of a case where the processing order is changed is explained referring to FIGS. 7A and 7B. In FIG. 7A the tracking object circumscribed rectangle 701 is detected as a human body, the tracking object circumscribed rectangle 703 is detected as a dog, and each of the human body attributes and the dog attributes are managed by the trajectory management unit 106. No specific object detection processing detected anything for the tracking object circumscribed rectangle 702 and so no attributes were assigned to it. Next, in the state shown in FIG. 7B, in the case where object detection processing or specific object detection processing after object tracking is performed, usually the detection processing order is performed in an order of a scan line direction from the top left of the screen to the bottom right. For this reason, specific object detection processing is performed in the order: tracking object 713, tracking object 712, tracking object 711. Here, regarding the tracking object to which an attribute is already assigned, the processing order may be put off until later, and processing of an object to which no attribute is assigned may be performed first. In this way, by changing the processing order in accordance with the state of how attributes are assigned, because processing is performed focusing on objects to which attributes are not assigned, it is possible to perform specific object detection processing at high precision and high speed.

Also, the specific object detection frequency may be controlled by the human body detection unit in accordance with the frequency that the human body detection unit detected an object as a human body within a predetermined time period. For example, control may be performed so that the higher the frequency at which the human body detection unit detected an object as a human body within a predetermined time period the lower the frequency specific object detection on the region of that object is performed by the human body detection unit.

Also, predetermining a maximum number of times that human body detection processing can be performed for one frame (or for within a particular period of time) may be done and when a processing count exceeds a predetermined number, human body detection processing may be cancelled, and put off until the next time processing is done. Alternatively, a maximum time (maximum load) for which it is possible to assign to human body detection processing for one frame (or for within a particular period of time) may be predetermined and when the load exceeds a specific amount (maximum value), human body detection processing may be cancelled there and put off until the next time processing is done. The time (load) for which it is possible to assign to human body detection processing could be determined based on the number of times or the frequency of performance of specific internal processing, based on the usage time or usage rate of a CPU for the processing, or based on a memory usage rate, and is not limited so long as it is related to the load.

Furthermore, it is possible to combine interruption processing, processing to put off processing until the next time and processing to change the order of specific object detection processing. By combining the above described 2 types of processing, it is possible to perform the real time processing of processing from the tracking object having the highest priority, and when the next frame image is input, cancelling and putting the processing off.

Figure 6:
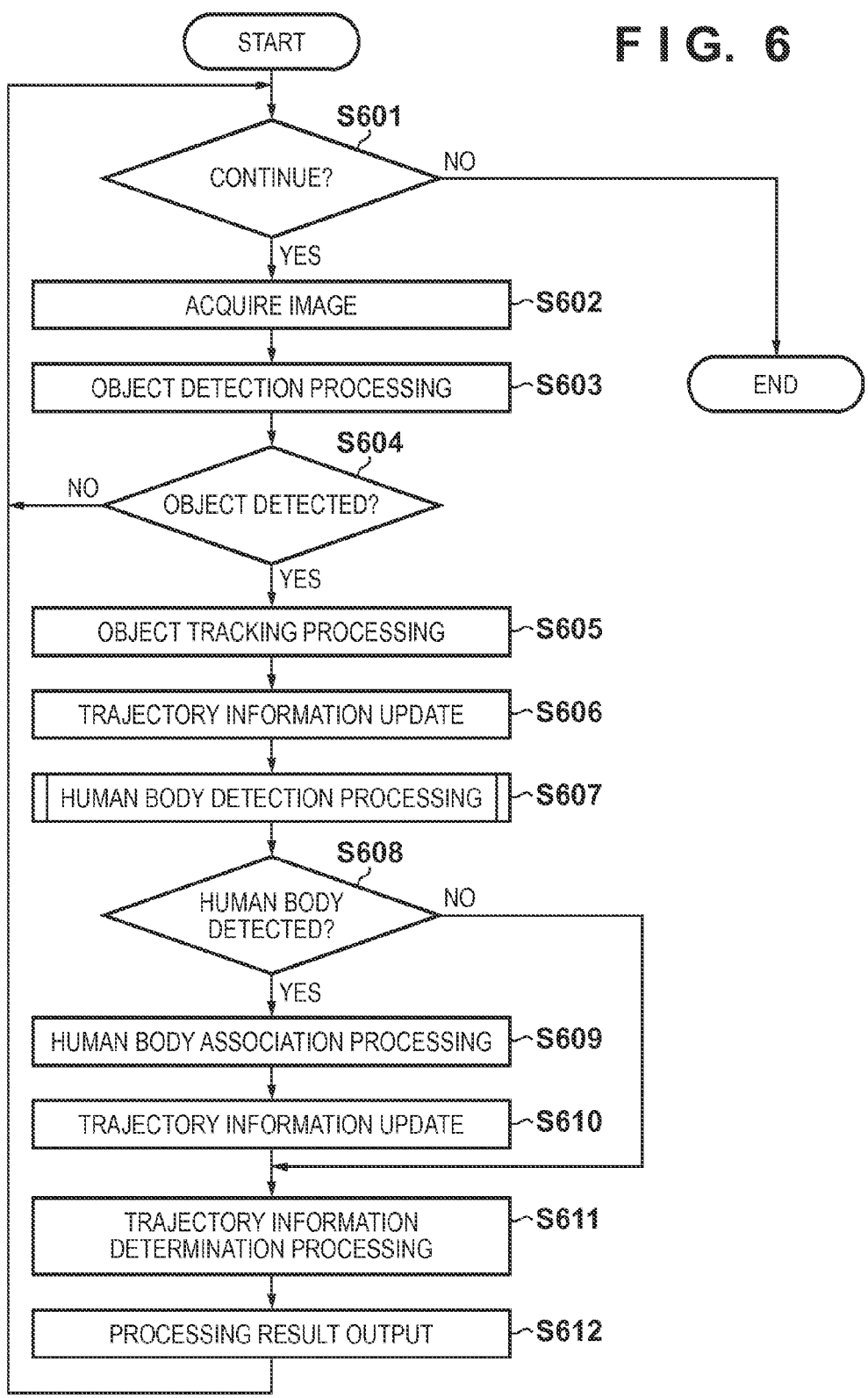
FIG. 6 is a flowchart for describing a processing procedure of the video processing apparatus 100.

Next, referring to the flowchart of FIG. 6 a processing procedure that the video processing apparatus 100 executes according to the present embodiment will be described. Note, it is assumed that at the starting point at which processing according to this flowchart begins, determination parameters such as those shown in FIG. 4 are already registered.

In step S601, a control unit (not shown) of the video processing apparatus 100 determines whether or not to continue processing. For example, it is determined whether to continue processing in accordance with whether or not an instruction to end was input by a user. In the case where it was determined that the processing will continue (S601; YES) the processing proceeds to step S602. On the other hand, in the case where it was determined that the processing will not continue (S601; NO) the processing ends.

In step S602, the image acquisition unit 101 acquires the input image. In step S603, the object detection unit 102 performs object detection processing on the acquired image. In step S604, the object detection unit 102, as a result of object detection processing, determines whether or not an object was detected. In the case where it was determined that an object was detected (S604; YES) the processing proceeds to step S605. On the other hand, in the case where it was determined that an object was not detected (S604; NO) the processing returns to step S601.

In step S605, the object tracking unit 103 performs object tracking processing. In step S606, the trajectory management unit 106 updates tracking information according to the result of the tracking processing.

Figure 8:
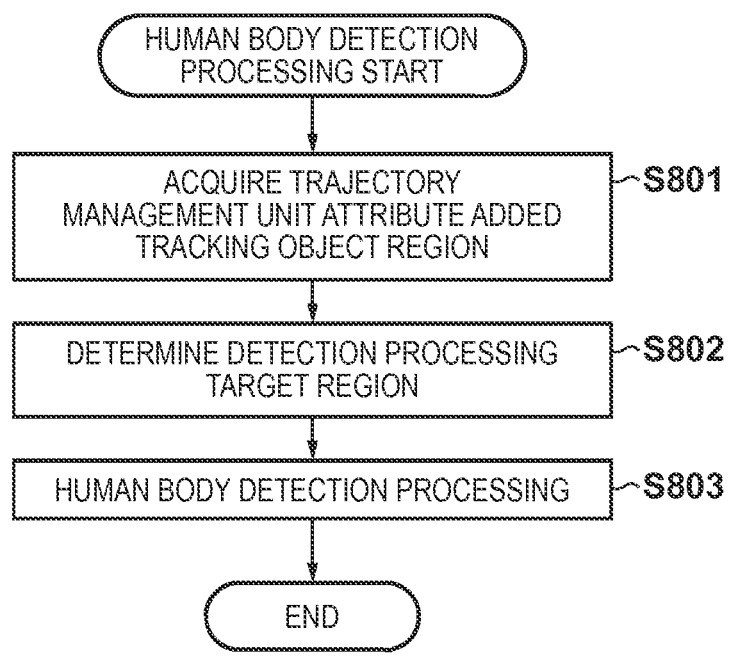
FIG. 8 is a flowchart for a describing subroutine processing procedure of human body detection processing.

In step S607, the human body detection unit 104 executes human body detection processing. Here, referring to the flowchart of FIG. 8 a human body detection processing subroutine procedure will be explained. In step S801, the human body detection unit 104 extracts a tracking object to which the trajectory management unit 106 assigned an attribute and acquires the circumscribed rectangle region (Boundingbox value) of the object.

In step S802 the human body detection unit 104, based on an object region that the object detection unit 102 detected and a tracking object region to which an attribute is assigned which was acquired in step S801, determines a target region of specific object detection processing. In other words, out of the object regions that the object detection unit 102 detected, the frequency that an tracking object region to which an attribute is assigned is made to be the target of specific object detection processing is made to be less than that of tracking object regions other than those to which an attribute is assigned. For example, an tracking object region to which an attribute is assigned is made to be the target of specific object detection processing every second frame. In contrast to this, an object region other than the tracking object regions to which an attribute is assigned is made to be the target of specific object detection processing every frame. For the tracking object regions to which an attribute is assigned priority for performance of specific object detection processing is made to be lower than that of moving object regions other than tracking object regions to which an attribute is assigned.

In step S803, the human body detection unit 104 performs human body detection processing on the target regions of specific object detection processing determined in step S802. With this the processing of FIG. 8 ends, and the processing proceeds to step S608 of FIG. 6.

In step S608, the human body detection unit 104 determines whether or not a human body was detected according to the human body detection processing performed in step S607. In the case where it was determined that a human body was detected (S608; YES) the processing proceeds to step S609. On the other hand, in the case where it was determined that a human body was not detected (S608; NO), the processing proceeds to step S611.

In step S609, the object associating unit 105 performs association of an object and a human body. In step S610, the trajectory management unit 106 updates the tracking information based on the result of association processing.

In step S611, the trajectory information determination unit 108 performs determination processing of the trajectory information. In step S612 the external output unit 110 outputs the trajectory information determination result externally. After that the processing returns to step S601.

As explained above, with the present embodiment, when specific object detection processing is performed using object information the frequency at which specific object detection processing is performed is adjusted in accordance with object attribute information. More specifically, in accordance with attribute information that an object tracking unit assigned to an object it is tracking, the frequency at which specific object detection processing is again executed on the region of the object that is tracked is controlled to be less. With this it is possible to execute special object detection in video acquired from a monitoring camera, etcetera, at high speed and at high precision.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-141467 filed on Jun. 22, 2012, which is hereby incorporated by reference herein in its entirety.

What is claimed is:

1. An image processing apparatus comprising:
a processor; and
a memory for storing instructions to be executed by the processor,
wherein when the instructions stored in the memory are executed by the processor, the processor functions as:
a detection unit configured to perform detection processing for detecting an object on a plurality of image frames;
a tracking unit configured to track the detected object;
a specifying unit configured to perform specifying processing for specifying classification of the detected object based on image data of the detected object;
a determining unit configured to determine, an order of performing the specifying processing for a plurality of tracking objects in a target image frame following the plurality of image frames such that the specifying processing for one or more tracking objects whose classification is already specified a predetermined times by the specifying unit in the plurality of image frames is performed later than one or more tracking objects whose classification is not specified the predetermined times by the specifying unit in the plurality of image frames; and
a control unit configured to control the specifying unit to perform the specifying processing on the target image frame according to the order determined by the determining unit.

2. The image processing apparatus according to claim 1, wherein there is an upper limit on a number of times that the specifying unit performs the specifying processing in a predetermined period.

3. The image processing apparatus according to claim 1, wherein there is an upper limit on a number of times that the specifying unit performs the specifying processing on an object in one image frame.

4. The image processing apparatus according to claim 1, wherein the classification represents a type of the detected object, and wherein the type includes at least one of a human body, a face, a car, a train, an airplane or an animal.

5. An image processing method comprising:
a detection step of performing detection processing for detecting an object on a plurality of image frames;
a tracking step of tracking the detected object;
a specifying step of performing specifying processing for specifying classification of the detected object based on image data of the detected object;
a determining step of determining an order of performing the specifying processing for a plurality of tracking objects in a target image frame following the plurality of image frames such that the specifying processing for one or more tracking objects whose classification is already specified a predetermined times in the specifying step in the plurality of image frames is performed later than one or more tracking objects whose classification is not specified the predetermined times in the specifying step in the plurality of image frames; and
a control step of controlling the specifying step to perform the specifying processing on the target image frame according to the order determined in the determining step.

6. A non-transitory computer-readable storage medium storing a program for causing a computer to execute image processing, the program causing the computer to execute a method comprising:
a detection step of performing detection processing for detecting an object on a plurality of image frames;
a tracking step of tracking the detected object;

a specifying step of performing specifying processing for specifying classification of the detected object based on image data of to the detected object;

a determining step of determining an order of performing the specifying processing for a plurality of tracking objects in a target image frame following the plurality of image frames such that the specifying processing for one or more tracking objects whose classification is already specified a predetermined times in the specifying step in the plurality of image frames is performed later than one or more tracking objects whose classification is not specified the predetermined times in the specifying step in the plurality of image frames; and a control step of controlling the specifying step to perform the specifying processing on the target image frame according to the order determined in the determining step.

* * * * *